Jan. 2, 1968  A. THEULEAU  3,361,422
VARIABLE FLOW HYDRAULIC SHOCK ABSORBER
Filed July 7, 1965  2 Sheets-Sheet 1
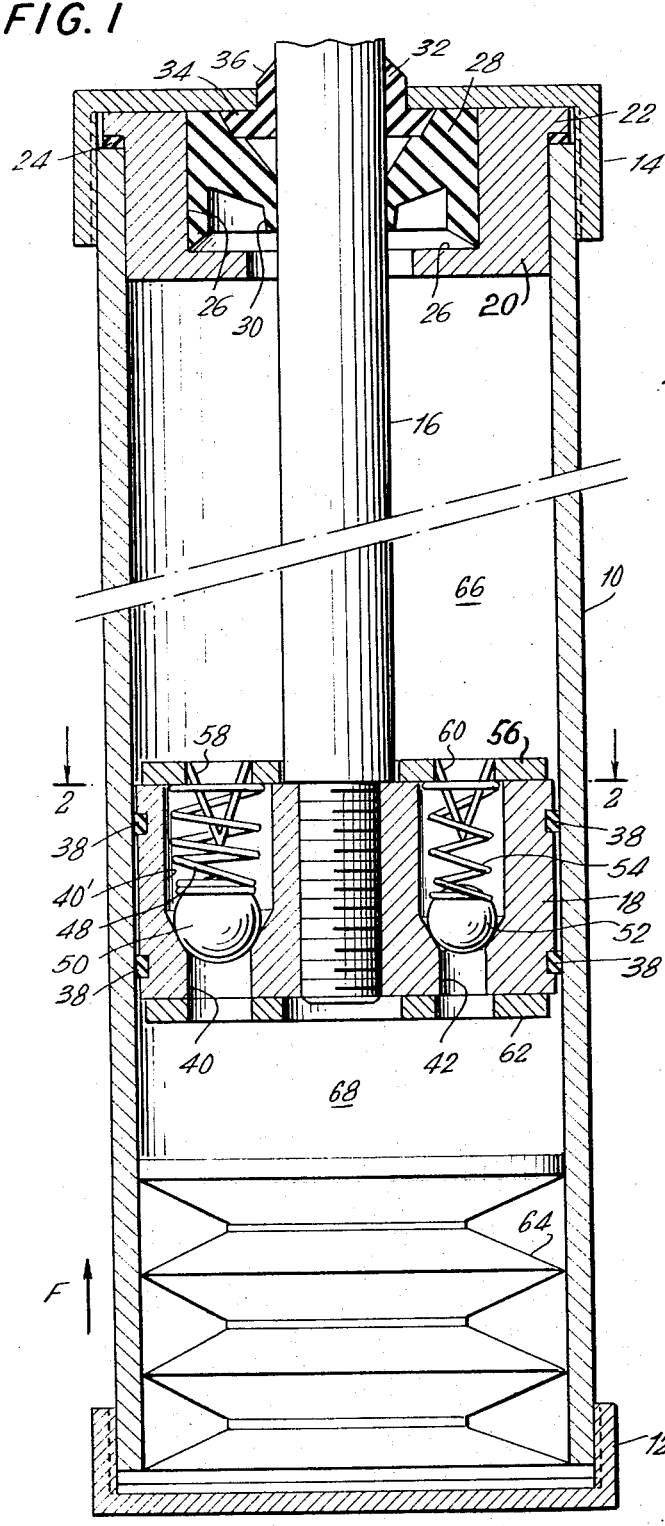
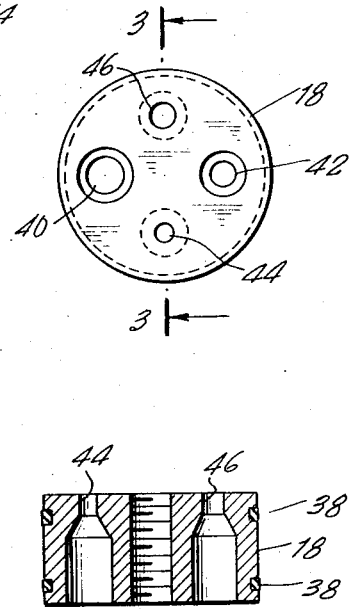
INVENTOR.
ACHILLE THEULEAU
ATTORNEY

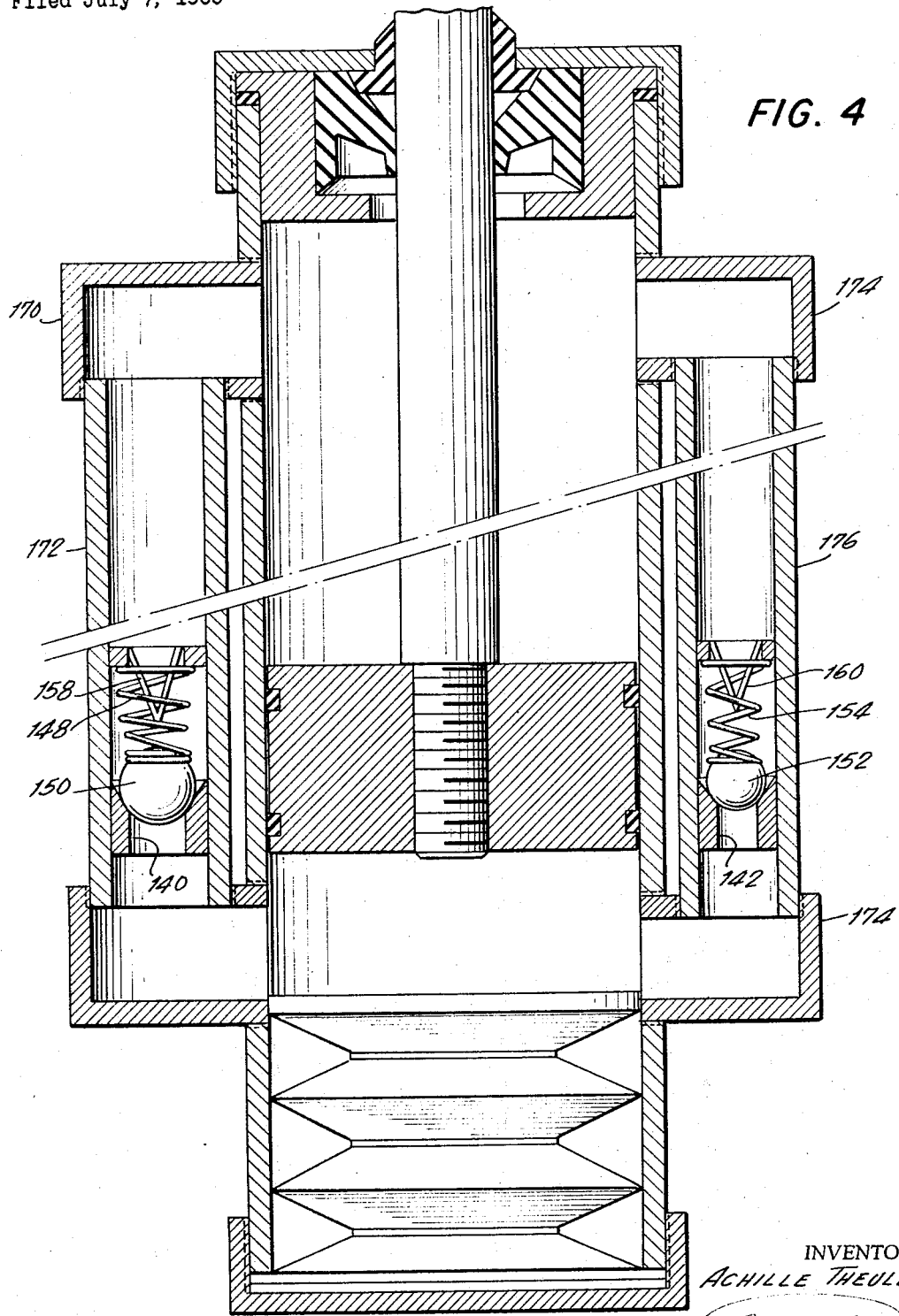

United States Patent Office 3,361,422
Patented Jan. 2, 1968

3,361,422
VARIABLE FLOW HYDRAULIC SHOCK
ABSORBER
Achille Theuleau, Casablanca, Morocco
Filed July 7, 1965, Ser. No. 469,989
Claims priority, application France, July 16, 1964,
981,820
4 Claims. (Cl. 267—64)

ABSTRACT OF THE DISCLOSURE

This invention contemplates a hydraulic shock absorber comprising in combination a cylinder, a piston within said cylinder dividing it into two chambers, a connecting rod to said piston extending to the exterior of the cylinder, and a plurality of orifices provided in said piston for the forward flow of hydraulic fluid therethrough, said orifices being provided with check valves to prevent the reverse flow of hydraulic liquid therethrough.

This invention relates to haydraulic shock absorbers. In particular, this invention relates to improved shock absorbers providing for a variable flow of hydraulic fluid depending on the severity and magnitude of the shock being absorbed.

All conventionally known shock absorbers consist essentially of a cylinder containing a rod connected to a piston. Inside the cylinder, the piston separates two chambers filled with oil. Of the two elements, namely the cylinder and the piston-rod combination, one is connected to the working parts which transmit shocks, for example a wheel of a vehicle, and the other is connected to the parts to be insulated from shock, such as the vehicle body. In the usual arrangement, the shock absorber is connected in parallel with a spring, and shocks are damped partly by the compression of the spring and partly by the flow of part of the oil in the shock absorber from one to the other of the two chambers in the cylinder, resulting from the relative displacement of the piston inside the cylinder. After the compressive force of the shock has terminated, the spring tends to return to its normal, uncompressed condition, and as it does so, the piston is also returned to its original position within the cylinder by the force of the spring.

In these hydraulic shock absorbers the flow of oil in the direction corresponding to the damping of a shock, as well as the flow in the opposite direction when the device returns to a normal position under the action of the spring, takes place through a single calibrated aperture, stopped up in some instances by a moving valve. In such a device, the area of the aperture through which the damping oil flows is always the same, regardless of whether the shock is a brutal one acting through a large amplitude, or a relatively weak one. This leads to a lack of progressiveness and flexibility.

Moreover, conventional shock absorbers ordinarily contain a certain quantity of air in the cylinder along with the hydraulic fluid. As the piston moves back and forth in the cylinder, this air mixes freely with the oil, and forms an emulsion. The properties of this emulsion change in the course of time, because of oxidation and physical working, which, in turn, makes the behavior of the shock absorber unreliable, depending on the length of time it is used and the severity of the service. Also, even in the absence of such oxidation, the oil-air emulsion is compressible, and exhibits variable and unpredictable flow proper ties in the orifice, depending on the amount of air in the oil, and its degree of dispersion.

An object of this invention, therefore, is to provide improved shock absorbers.

Another object is to provide a shock absorber which offers a great progressiveness of action.

Still another object is to provide a shock absorber having a substantially constant output over an extended period of time.

A feature of this invention is the provision of a piston having a plurality of apertures for the flow of hydraulic fluid therethrough.

Another feature is the provision of such apertures in a plurality of sizes.

Still another feature is the provision of separate apertures for forward and reverse flow of hydraulic fluid through the piston.

A further feature is the provision of spring-loaded check valves to confine the flow of fluid through any given aperture to a single direction.

Another feature still is the provision of a plurality of apertures for flow of fluid in one direction, said apertures being provided with check valves openable at mutually differing degrees of fluid pressure.

Yet another feature is the provision of apertures for forward flow and apertures for reverse flow of fluid through the piston, the apertures for forward flow differing in area from the apertures for reverse flow.

Another feature is the provision of a separate chamber in the cylinder, having flexible walls and containing a compressible gas such as air.

Other objects, features and advantages will become more apparent from the following more complete description and claims, and by reference to the accompanying drawings.

In one particularly desirable embodiment, this invention contemplates a hydraulic shock absorber comprising in combination a cylinder, a piston within said cylinder dividing the same into two chambers, a connecting rod connected to said piston and extending to the exterior of said cylinder, a plurality of orifices in said piston providing for flow of hydraulic fluid through said piston in a direction corresponding to the damping of a shock, said orifices being provided with check valves to prevent reverse flow of hydraulic fluid through said orifices, said check valves being openable in response to mutually differing values of applied hydraulic pressure, and at least one return orifice in said piston providing for flow of hydraulic fluid in a direction corresponding to return of said piston to normal position following the damping of a shock, and a check valve associated with said return orifice to prevent forward flow therethrough.

Some shock absorbers are built to be filled with an oily hydraulic fluid and others are built for use with other types of hydraulic fluid. The apparatus of this invention is equally applicable to either type, and the terms "oil" and "hydraulic fluid" are used interchangeably herein.

Also, for purposes of brevity, the convention is adopted herein of referring to fluid flow in a direction corresponding to the damping of a shock as "forward" flow, and to fluid flow in a direction corresponding to the return of the piston to its normal position after damping a shock as "reverse" flow.

In the preferred embodiments of this invention, the piston is provided with a plurality of return orifices, as well as a plurality of forward orifices, and the return orifices are also provided with check valves openable at mutually differing degrees of hydraulic pressure.

Also in the preferred embodiments, there is provided a separate chamber within the cylinder, the separate chamber having flexible walls and containing a compressible gas such as air. The use of such a separate chamber provides the advantage of having air or other compressible gas in the system, as it provides a means of absorbing extremely sharp shocks. The hydraulic fluid is for all practical purposes totally incompressible, and a very sharp shock is transmitted through the fluid almost instantaneously, and can exert the force of a hammer-blow on the internal parts of the apparatus with consequent danger of damaging them. The provision of a compressible gas such as air in the system provides a way of absorbing and diminishing the sharpness of such hard, sharp potentially damaging shocks. At the same time, the confinement of the air in the separate chamber prevents mixing of the air with the hydraulic fluid, and the attendant disadvantages referred to above.

Referring now to the drawings:

FIGURE 1 is a longitudinal cross-section of a shock absorber according to the invention.

FIGURE 2 is a top view of the piston, taken along the line 2—2 of FIGURE 1, with the ball-checks and springs omitted.

FIGURE 3 is a cross-section along line 3—3 of FIGURE 2.

FIGURE 4 is a longitudinal cross-section similar to FIGURE 1, showing another embodiment of the invention.

Referring now more particularly to FIGURE 1, the apparatus comprises a cylinder 10 closed at one end by a solid lower head 12 which is screwed on cylinder 10, and which is closed at the other end by a pierced upper head 14, also screwed on cylinder 10. Connecting rod 16 moves through the opening in head 14. At the lower end of rod 16 is piston 18, which is screwed on the end of rod 16. At the upper end of a cylinder 10 and inside head 14 is a seal-holder 20, having a flange 22 projecting from its upper end. A sealing ring or gasket 24 is compressed between flange 22 and the upper end of cylinder 10.

A recess 26 is provided in seal-holder 20. Within recess 26, an insulating seal 28 is fitted.

Seal 28 has a depending elastic lip 30 which snugly embraces rod 16. A second tubular dust-scraping seal 32, encircles rod 14 and is provided with a flange 34 which is compressed between seal 28 and the upper head 14. Dust-scraping seal 32 projects out of the upper head 14 and presents, externally to cylinder 10, a bevelled edge 36.

Piston 18 is fitted with sealing rings 38. Four apertures 40, 42, 44 and 46 (of which, apertures 40 and 42 are visible in FIGURE 1) are bored through the piston 18 parallel to the axis of cylinder 10. All of these are of generally similar construction.

Aperture 40, for example, comprises two cylindrical sections joined by a frustrum of a cone. The major cylindrical section 40' is greater in length and diameter than the other, lower cylindrical section. A ball 50 is seated against the conical section joining the two cylindrical sections, and is urged into seating relation therewith by spring 48. Aperture 42 is constructed similarly to aperture 40, but has smaller dimensions in the diameters of the two cylindrical sections, and employs a correspondingly smaller ball 52, urged into seating relation with its conical section by spring 54. Spring 54 is stronger than spring 48. A thin plate 56 is integrally connected to the upper face of piston 18. Plate 56 is pierced by four apertures registering respectively with apertures 40, 42, 44 and 46. In those which register with apertures 40 and 42, there are provided a pair of stops 58, 60 which penetrate into the upper, major cylindrical sections of apertures 40 and 42, respectively, but not sufficiently far so as to reach balls 50 and 52.

Apertures 44 and 46 are constructed similarly to apertures 40 and 42, but in the opposite direction, i.e. their major cylindrical sections open downward, into the part of the cylinder remote from rod 16. The general dimensions of aperture 46 are smaller than those of aperture 42, and those of aperture 44 are smaller than those of aperture 46. The spring (not shown) associated with aperture 44 is stronger than that associated with aperture 46.

By way of example, the respective diameters of the minor cylindrical sections of apertures 40, 42, 44 and 46 may be, respectively, 0.6 mm., 0.4 mm., 0.2 mm., and 0.3 mm.

The diameters of the major cylindrical sections of apertures 40, 42, 44 and 46 are not critical, but they should be at least wide enough so that, when the ball is lifted into the major cylindrical section, the annular space between the walls and the ball is equal to or greater than the cross-sectional area of the minor cylindrical section so that no further impediment to fluid flow is presented, beyond that imposed by the restricted dimensions of the minor cylindrical section.

A second thin plate 62 is integrally attached to piston 18 on the side thereof opposite from rod 16. It bears two stops (not visible in the drawings) similar to stops 58 and 60, which project upwardly into apertures 44 and 46, and has four apertures registering respectively with the lower ends of apertures 40, 42, 44 and 46.

An accumulator 64 in the form of a chamber defined by flexible, accordion-pleated walls and containing air is placed close to lower head 12.

Piston 18, as shown in FIGURE 1, divides the interior of the cylinder into two oil-filled chambers 66 and 68.

The manner in which the apparatus operates is as follows:

Lower head 12 is solidly connected to a moving part which receives shocks, for example a wheel of a motor vehicle, and piston-rod 16 is solidly connected to the body to be protected, for example the body of the vehicle. A spring, not shown, is connected to the wheel and to the body in parallel with the shock absorber.

When an unevenness in the ground generates a pressure represented by arrow F, the spring is compressed and cylinder 10 tends to move, in relation to piston 18, in the direction indicated by the arrow. The oil, being compressed in chamber 68, lifts the ball-check 50 and flows through aperture 40 into chamber 66. It thus permits motion of cylinder 10 in the indicated direction, but tends to retard it. The pressure corresponding to arrow F is greater, in proportion as the unevenness in the road is greater and the speed of the car is higher. Spring 54 is stronger than spring 48, and consequently, ball 52 is not lifted until the magnitude of the force indicated at F is such as to generate in chamber 68 a pressure higher than that needed to lift ball 50. At this point, oil is free to move from chamber 68 to chamber 66 through both aperture 40 and aperture 42, and the apparatus therefore responds more quickly to the pressure generated by a heavy shock than it does to a relatively weak one.

As will be readily apparent to those skilled in the art, the response characteristics of thte shock absorber in response to varying magnitudes of shock can be predetermined at will, by varying the cross-sectional areas of apertures 40 and 42, as well as their number, and the strengths of the springs. In the same manner, the recovery characteristics after the shock is damped may be predetermined by varying the number and the several areas and spring strengths of the return apertures. In the embodiment illustrated and just described, only aperture 40 comes into play for damping a weak shock, whereas both aperture 40 and aperture 42 take part in the damping of a strong shock. Similarly, after a weak shock has been damped, the compression of the spring and the displacement of piston 18 from its normal position are relatively small, and the force exerted by the spring against piston rod 16, tending to compress the fluid in chamber 68, are correspondingly small, so that only aperture 46 comes into play for returning fluid from chamber 66 to chamber 68. On the other hand, after a severe shock, the compression of the spring is greater as is the displacement of piston 18 from its normal position. Under these conditions, a more rapid recovery is needed, and it is provided by the fact that the spring, being more highly compressed, exerts an upward force on the piston sufficient to compress the fluid in chamber 66 enough to open aperture 44 as well as aperture 46.

For other applications, one may provide for a larger number of apertures for the flow of hydraulic oil through the piston, and their diameters and spring strengths may be varied depending on the response characteristics desired in the shock absorber for shocks of various degrees of severity.

Chamber 64 plays an important role in providing smoothness in the response of the shock absorber. The separation of oil from air by this means makes the shock-absorber response more constant and uniform by preventing the formation of an unstable emulsion which would otherwise take place. Moreover, in case the oil pressure in chamber 68 should suddenly increase, the elasticity of chamber 64 damps the potentially damaging shock which would otherwise result from this increase, and smooths out the flow of oil from chamber 68 to chamber 66.

Obviously, one may, without departing from the invention, provide for a chamber 64 of different shape from that illustrated, or if differently inside chamber 68, immersed in the hydraulic fluid.

In the apparatus as described, return apertures 44 and 46 have smaller cross-sectional areas than forward apertures 40 and 42. This difference is justified by the fact that, in most applications, the return motion brought about by the force of the compressed spring is slower than the "forward" motion caused by the initial shock. This arrangement is not, however, compulsory and in certain special applications one may, without departing from the invention, provide return apertures having cross-sectional areas equal to or greater than those of the forward apertures 40 and 42.

FIGURE 4 illustrates another embodiment of the invention, which differs from the embodiment of FIGURES 1–3 in that the flow of oil between the two chambers in the cylinder takes place, not through the thickness of the piston, but through auxiliary conduits mounted externally of the cylinder and communicating with the two chambers. In this embodiment, the piston is solid, and the check valves are located in the external conduits.

As shown in FIGURE 4, appropriate right-hangle fittings 170 are tapped into cylinder 10 or otherwise affixed to communicate with the interior thereof. The right-angle fittings 170 are connected to the ends of a conduit 172 running parallel to cylinder 10. Inside conduit 172 is an orifice 140, a ball 150, a spring 148, and a plate with a stop 158, all of which are constructed similarly to and serve the same purposes as the corresponding elements 40, 50, 48 and 58 of the embodiment shown in FIGURE 1. Additional right-angle fittings 174 connect the chambers in the cylinder to another external conduit 176, containing an orifice 142, a ball 152, a spring 154 and a plate with a stop 160 all constructed similarly to and functioning in the same way as the corresponding elements 42, 52, 54 and 60, respectively, of the embodiment of FIGURE 1. At least one, and preferably two or more additional conduits (not shown) are provided to carry the return flow of oil into the lower chamber. The return flow conduits are constructed similarly to conduits 172 and 176, except that they are preferably smaller and are inverted so that they function in the reverse direction, similarly to orifices 44 and 46 of the embodiment of FIGURE 1 (shown in FIGURES 2 and 3).

While this invention has been described with reference to certain preferred embodiments and illustrated by way of certain drawings, these are illustrative only, as many alternatives and equivalents will readily occur to those skilled in the art, without departing from the spirit or proper scope of the invention. The invention is therefore not to be construed as limited, except as set forth in the appended claims.

I claim:
1. A hydraulic shock absorber comprising in combination a cylinder, a piston within said cylinder dividing the same into two chambers, a connecting rod connected to said piston and extending to the exterior of said cylinder, a plurality of conduits providing for flow of hydraulic fluid from one to the other of said two chambers in a direction corresponding to the damping of a shock, said conduits being provided with check valves to prevent reverse flow of hydraulic fluid through said conduits, said check valves being openable in response to mutually differing values of applied hydraulic pressure, at least one return conduit providing for flow of hydraulic fluid from one to the other of said two chambers in a direction corresponding to the return of said piston to normal position following the damping of a shock, and a check valve associated with said return conduit to prevent forward flow therethrough.

2. A hydraulic shock absorber according to claim 1, further comprising an inner chamber located within one of said two chambers, said inner chamber being defined by flexible walls and containing a compressible gas.

3. A hydraulic shock absorber comprising in combination a cylinder, a piston within said cylinder dividing the same into two chambers, a connecting rod connected to said piston and extending to the exterior of said cylinder, a plurality of conduits providing for flow of hydraulic fluid from one to the other of said two chambers in a direction corresponding to the damping of a shock, said conduits being provided with check valves to prevent reverse flow of hydraulic fluid through said conduits, said check valves being openable in response to mutually differing values of applied hydraulic pressure, a plurality of return conduits providing for flow of hydraulic fluid from one to the other of said chambers in a direction corresponding to the return of said piston to normal position following the damping of a shock, and a check valve associated with each of said return conduits to prevent forward flow therethrough, said check valves associated with said return conduits being openable in response to mutually differing values of applied hydraulic pressure.

4. A hydraulic shock absorber comprising in combination a cylinder, a piston within said cylinder dividing the same into two chambers, a connecting rod connected to said piston and extending to the exterior of said cylinder, a plurality of orifices in said piston providing for flow of hydraulic fluid through said piston in a direction corresponding to the damping of a shock, said orifices being provided with check valves to prevent reverse flow of hydraulic fluid through said orifices, said check valves being openable in response to mutually differing values of applied hydraulic pressure, at least one return orifice in said piston providing for return flow of hydraulic fluid in a direction corresponding to return of said piston to normal position following the damping of a shock, and a check valve associated with said return orifice to prevent forward flow therethrough.

References Cited

UNITED STATES PATENTS

| | | | |
|---|---|---|---|
| 2,323,321 | 7/1943 | Futral | 188—96.51 |
| 2,856,035 | 10/1958 | Rohacs | 267—64 |
| 3,003,594 | 10/1961 | Bourcier de Carbon | 188—96.5 |
| 3,287,008 | 11/1966 | Fernandez | 267—64 |

FOREIGN PATENTS

| | | |
|---|---|---|
| 1,082,073 | 6/1954 | France. |
| 1,096,528 | 6/1955 | France. |
| 920,709 | 11/1954 | Germany. |

ARTHUR L. LA POINT, *Primary Examiner.*

R. M. WOHLFARTH, *Assistant Examiner.*